United States Patent
Crain et al.

(10) Patent No.: US 6,975,082 B2
(45) Date of Patent: Dec. 13, 2005

(54) VARIABLE SPEED DRIVE WITH A SYNCHRONOUS ELECTRIC MOTOR

(76) Inventors: Stephen G. Crain, 110 W. Westmoreland Rd., Falls Church, VA (US) 22046; Joel B. Jermakian, 121 Great Falls St., Falls Church, VA (US) 22046

( * ) Notice: Subject to any disclaimer, the term of this patent is extended or adjusted under 35 U.S.C. 154(b) by 0 days.

(21) Appl. No.: 10/792,680

(22) Filed: Mar. 3, 2004

(65) Prior Publication Data

US 2005/0012486 A1    Jan. 20, 2005

Related U.S. Application Data

(60) Provisional application No. 60/450,767, filed on Mar. 3, 2003.

(51) Int. Cl.[7] .................................................. H02P 6/08

(52) U.S. Cl. ...................... 318/139; 318/254; 318/721

(58) Field of Search ............................... 318/138, 139, 318/254, 268, 430–434, 720–724

(56) References Cited

U.S. PATENT DOCUMENTS

| 4,544,868 | A | * | 10/1985 | Murty | 318/254 |
| 4,665,350 | A | * | 5/1987 | Angi et al. | 318/254 |
| 5,821,722 | A | * | 10/1998 | Forbes et al. | 318/696 |
| 6,541,939 | B2 | * | 4/2003 | Kishibe et al. | 318/799 |
| 6,838,842 | B2 | * | 1/2005 | Feustel et al. | 318/254 |

* cited by examiner

*Primary Examiner*—Bentsu Ro

(57) ABSTRACT

This invention relates to a variable speed drive with synchronous AC motor. In the disclosed embodiment, a variable speed drive operates in three modes: a first predetermined mode, in which a function (e.g., trapezoidal current waveform) controls operation at low motor speeds; a transitional mode, in which a transition function is applied to anticipate transitions of the first function, thus causing a smoothing of transitions at higher speeds; and a second predetermined (e.g., sinusoidal or smoothly-varying current) waveform at high speeds. This allows for the reduction in required rotor position sensor resolution as compared to conventional synchronous variable speed drives, resulting in cost savings in the sensor device and associated wiring. Additionally, it is quieter and more efficient operation at high speed as compared to conventional trapezoidal-current/DC-brushless motor drives.

22 Claims, 6 Drawing Sheets

Sensor State:  010    110    100    101    001    011

VARIABLE SPEED DRIVE WITH A SYNCHRONOUS ELECTRIC MOTOR

This application claims the benefit of application Ser. No. 60/450,767 filed Mar. 3, 2003.

TECHNICAL FIELD

Our invention generally relates to variable speed drives and, more specifically, the invention is related to the field of variable speed drives with synchronous electric motors.

BACKGROUND OF THE INVENTION

A problem in connection with ordinary variable speed drives is that they either require high-resolution position measurement devices, or must utilize stepped current waveforms that increase motor heating and acoustical noise. These stepped current waveforms, referred to as trapezoidal waveforms or "6-step" waveforms when applied to a three-phase motor, can also produce significant torque ripple. The use of high-resolution position measurement devices requires that the position measurement device be properly aligned relative to the stator and rotor poles. Frequently this alignment is a manual operation, further increasing costs.

Algorithms for performing sensorless control of electric motors abound; but generally fall into two categories, based on how they determine the rotor position at start-up. The first type applies a large current to the motor so as to force the rotor to a known position, irregardless of its current position. This requires that the application be tolerant of backwards motion at start-up, and that the load on the motor at start-up is minimal. The second type relies on special features incorporated into the rotor so as to allow the rotor position to be determined by applying and measuring signals to the stator windings. This type of algorithm is not suited for the majority of electric motors on the market, as they lack the requisite rotor features.

It is well known to use phase-locked loops to produce an electrical signal whose frequency is a multiple of an input signal. In a variable-speed drive, this high-frequency signal can be used to estimate the rotor position given a low-resolution position input. For example, a multiply by 360 phase-lock loop can produce one degree resolution from a one pulse-per-revolution rotor position sensor. This approach has a critical limitation, however, in that it cannot be used at arbitrarily low speeds. In many applications, it is required to operate the motor at stall, and/or to reverse the motor direction. In such a case, the phase locked-loop cannot remain synchronized, as the rotor may come to a halt or reverse direction between sensor input transitions.

Thus, there is a need for a variable speed drive, one which allows for greater accuracy and control over variable speed motors when operating at speeds less than those optimal for accurate phase locked loop operation.

SUMMARY

This invention relates to a variable speed drive having a synchronous AC electric motor. In the disclosed embodiment, a variable speed drive operates in three modes: a first predetermined mode, in which a function (e.g., trapezoidal current waveform) controls operation at low motor speeds; a transitional mode, in which a transition function is applied to anticipate transitions of the first function, thus causing a smoothing of transitions at higher speeds; and a second predetermined (e.g., sinusoidal or smoothly-varying current) waveform at high speeds. This allows for the reduction in required rotor position sensor resolution as compared to conventional synchronous variable speed drives, resulting in cost savings in the sensor device and associated wiring. Additionally, it is quieter and more efficient operation at high speed as compared to conventional trapezoidal-current/DC-brushless motor drives.

BRIEF DESCRIPTION OF THE DRAWINGS

The novel features believed characteristic of the invention are set forth in the appended claims. However, the invention itself, together with certain objectives and advantages, may best be understood by reference to the following detailed description of an illustrative, presently preferred embodiment thereof, when read in conjunction with the accompanying drawings, of which:

DESCRIPTION OF THE PREFERRED EMBODIMENT

Figure 1:
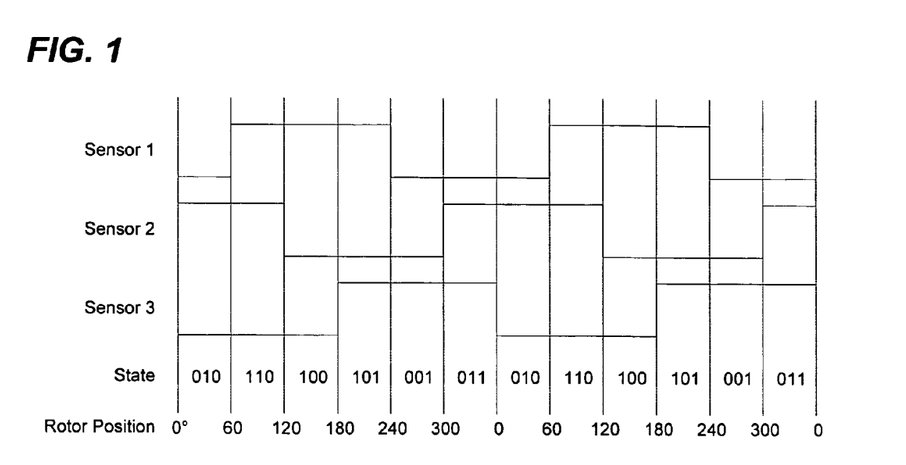
FIG. 1 is a diagram illustrating sensor state as a function of rotor position in accordance with a first embodiment of the invention.

The present invention comprises a polyphase electric motor equipped with plural binary output position sensors, configured such that each sensor asserts its output over a fixed angular range. Common sensors used for this purpose are Hall-effect devices exposed to the rotor's magnetic field and optical encoders. The ranges over which the sensors assert their outputs are by design or are determined during a motor calibration procedure. When multiple sensors are used, their ranges partially overlap, and the rotor position can be known to be within a reduced angular range based on the state of the sensors. For three phase synchronous motors it is common to use three sensors, arranged so that one of the three sensors changes state every 60°. With such an arrangement the rotor can always be known to be within a 60° range. This is illustrated in FIG. 1.

Figure 2:
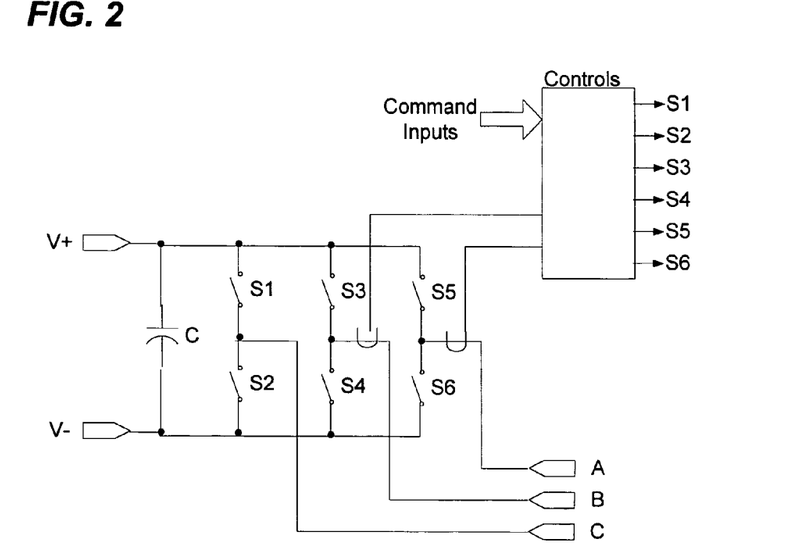
FIG. 2 is a circuit diagram of an illustrative embodiment of a three-phase inverter in accordance with the invention.

A second aspect of the preferred embodiment of the invention is a polyphase inverter. This inverter includes control means to produce periodic phase currents as a function of motor position and command inputs. FIG. 2 shows one such three-phase implementation of such an inverter, although those skilled in the art will appreciate a variety of different circuit or algorithmic approaches may be used, depending on the application. The switches S1–S6 are controlled based on the commands of a processor (not shown) that are fed to the inverter controller. Alternatively, the controller shown could be a unified controller/processor, receiving sensor and timing inputs and outputting switch control signals. The processor/controller can be a hardware/circuitry implementation for carrying out the functionality described herein, or an appropriately configured processor performing operations on instructions or programs, or some combination of the two, depending on the design choices selected. Depending on the switch position, a desired waveform will be produced at outputs A–C (three-phase, in the illustrated case), and applied to the drive unit.

Figure 3:
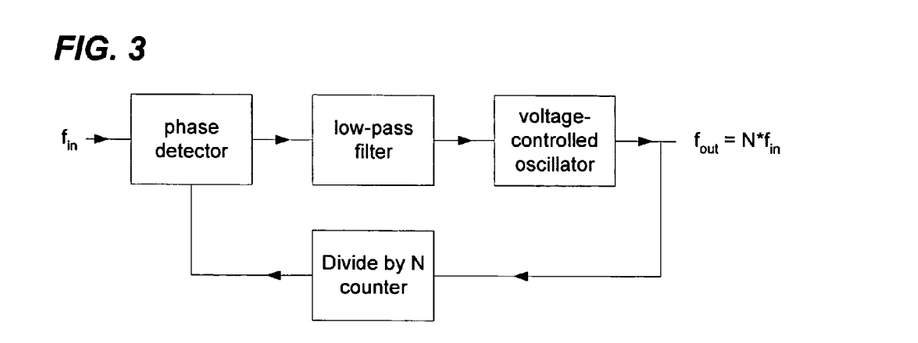
FIG. 3 is a block diagram of an illustrative phase locked loop control for high speed operation in accordance with the invention.

The third aspect of the preferred embodiment is a position estimator used to interpolate the rotor position between transitions of the position sensors. In one embodiment, the position estimator is a phase-locked loop. The outputs of the phase locked loop are a measured speed $\omega_{PLL}$ and an angular value $\theta_{PLL}$, with a resolution that is significantly smaller than the resolution of the position sensors. A typical phase-locked loop is illustrated in FIG. 3, where $f_{in}$ is a signal generated from the transitions of the position sensors, and $f_{out}$, is the output of the phase-locked loop. In an alternative embodiment, the phase-lock loop is implemented purely in the software of the polyphase inverter control means. In another embodiment, the time between a plurality of sensor transition events is used to calculate the rotor speed, and this speed is used by the estimator to estimate the rotor position.

A fourth aspect of the preferred embodiment is logic to calculate the angle $\theta_{ctrl}$ that will be fed to the inverter control. During initialization, $\theta_{ctrl}$ is set to the midpoint of the angular range determined by the position sensors. After initialization, the control angle logic operates in one of three modes, as determined by the measured motor speed. The three modes are referred to as the trapezoidal mode, transition mode, and continuous mode. The three modes are defined by two threshold speeds, $\omega_1$ and $\omega_2$. The control angle logic is in trapezoidal mode when $abs(\omega_{PLL})<\omega_1$, in continuous mode when $abs(\omega_{PLL})>\omega_2$ and in transition mode otherwise.

In the discussion that follows, all speeds are assumed to be in the positive direction for clarity, but this is not a limitation of the invention.

In the preferred embodiment, the threshold speeds are selected such that when the motor speed is greater than $\omega_1$, the system inertia is sufficient to guarantee that the motor will not come to a stop before the next sensor transition has been reached. The second threshold, $\omega_2$, is selected such to be the speed at which the position estimation means provides sufficient accuracy to be used by the inverter control means.

Figure 4:
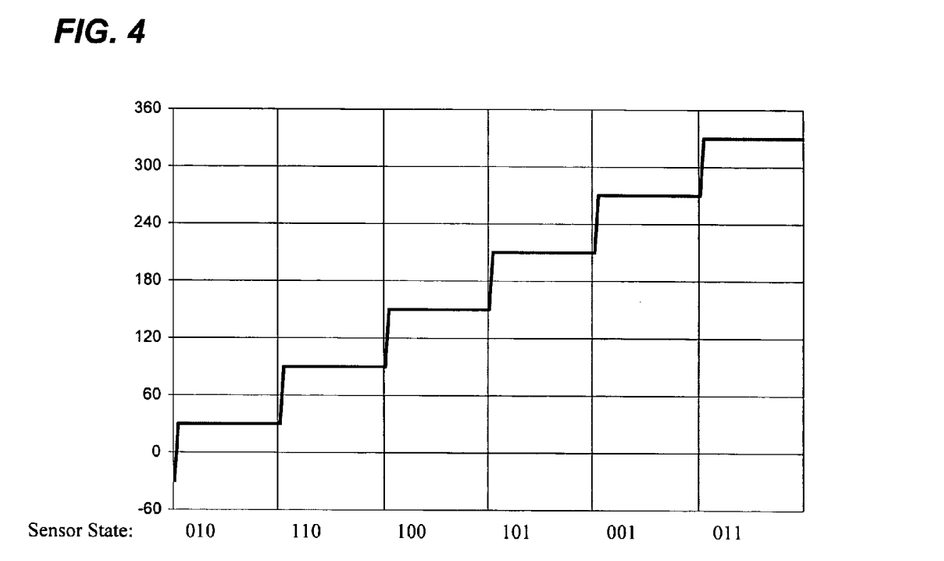
FIG. 4 illustrates the control angle $\theta_{ctrl}$ output as a function of sensor state when in a first mode of operation in accordance with the first embodiment of the invention.
Figure 5:
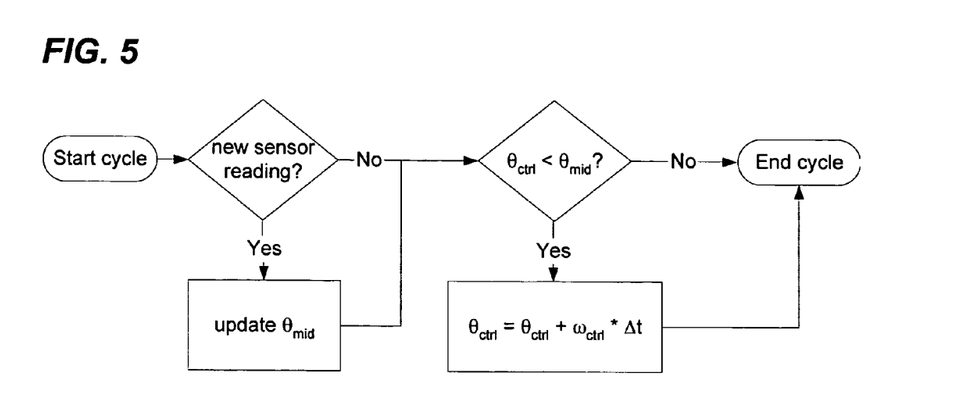
FIG. 5 illustrates the logic flow for control based on the $\theta_{ctrl}$ output as illustrated in FIG. 4.
Figure 6:
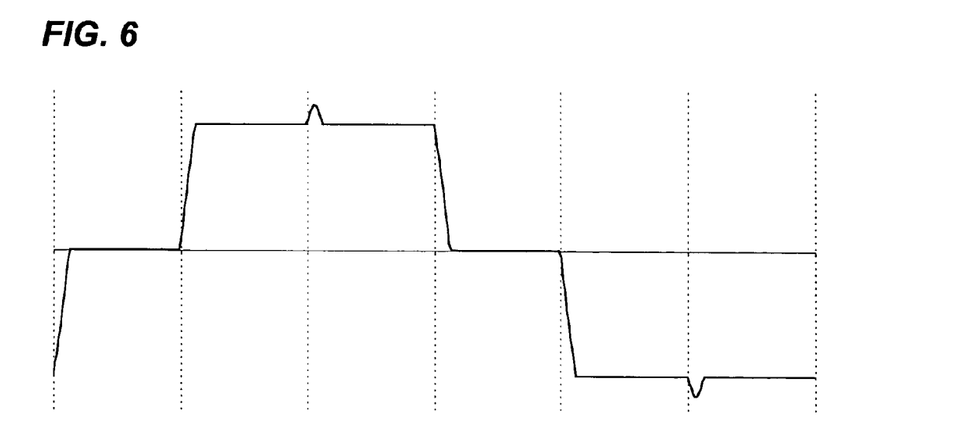
FIG. 6 illustrates the output currents as a function of time based on the control input as per FIGS. 4 and 5.

When in trapezoidal mode, $\theta_{ctrl}$ remains constant until a transition is detected on one of the position sensors. After the sensor transition, $\theta_{ctrl}$ is raised or lowered at a fixed rate, $\omega_{ctrl}$, much greater than $\omega_{min}$, to the midpoint value of the new angular-range determined by the position sensors. This is shown in FIG. 4. As a result, the maximum error between $\theta_{ctrl}$ and the actual rotor position is never greater than half the width of the current sensor interval. FIG. 5 shows this logic in flowchart form. When the inverter is three-phase and the control means is designed to produce sinusoidal currents as a function of $\theta_{ctrl}$, trapezoidal currents with controlled rise and fall times are produced, as shown in FIG. 6.

Figure 7:
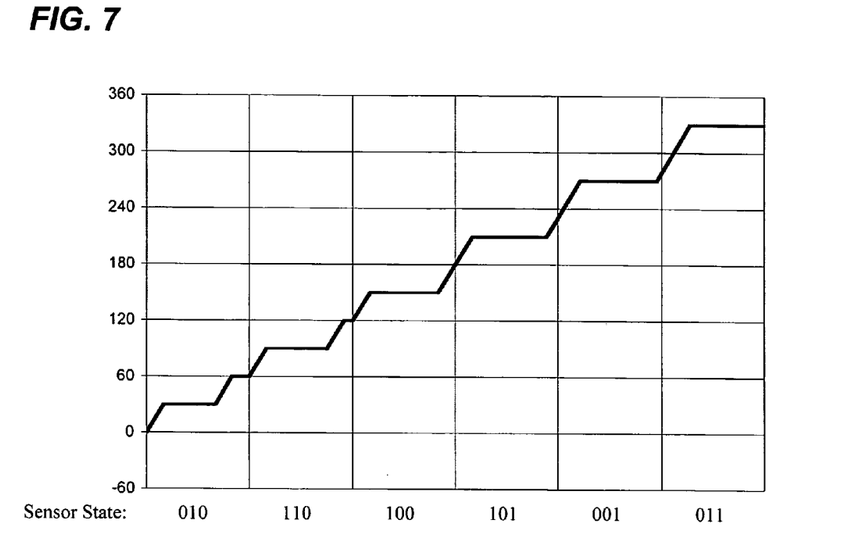
FIG. 7 illustrates the control angle $\theta_{ctrl}$ output as a function of sensor state when in a transition mode of operation in accordance with the first embodiment of the invention.
Figure 8:
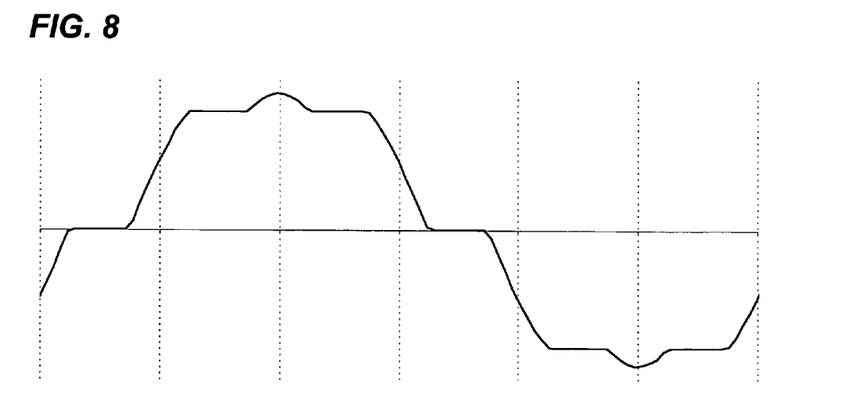
FIG. 8 illustrates the output currents as a function of time based on the control input as per FIGS. 7 and 9.
Figure 9:
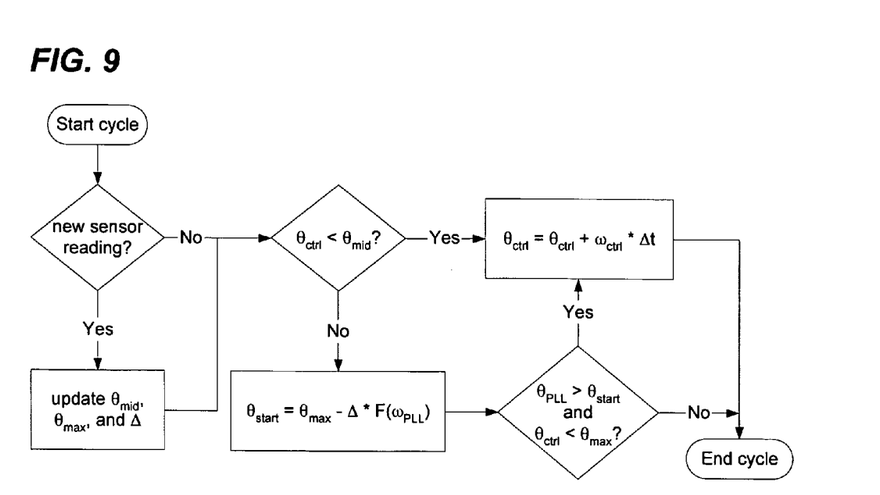
FIG. 9 illustrates the logic flow for control based on the $\theta_{ctrl}$ output as illustrated in FIG. 7.

When in transition mode, the position output of the phase-locked loop, $\theta_{PLL}$, is used to anticipate the sensor transition by $\Delta*F(\omega_{PLL})$, where F is a non-decreasing function equal to zero below $\omega_1$ and 0.5 above $\omega_2$, and $\Delta$ is the width of the current sensor interval. As illustrated in FIG. 9, the control angle logic holds $\theta_{ctrl}$ constant until $\theta_{PLL}>(\theta_{max}-\Delta*F(\omega))$, where $\theta_{max}$ is the angular position of the next sensor transition. When this condition is met, $\omega_{ctrl}$ is raised at a fixed rate $\omega_{ctrl}$ greater than $\omega_{PLL}$ to $\theta_{max}$. $\theta_{ctrl}$ is then held constant until the next sensor transition is detected, at which point $\theta_{ctrl}$ is again raised at $\omega_{ctrl}$ speed to the midpoint of the new sensor interval. When the motor is at constant speed or accelerating, these two transitions will occur without any delay between them. In one embodiment of the invention, $\omega_{ctrl}$ is set to $\omega_2$. In another embodiment, $\omega_{ctrl}$ is adjusted based on $\omega_{PLL}$ in such a way that it equals $\omega_2$ when $\omega_{PLL}$ equals $\omega_2$, but can take on different values at lower speeds. In either embodiment, the transition mode results in $\omega_{ctrl}$ equaling $\omega_2$ when $\omega_{PLL}$ equals $\omega_2$. Furthermore, function F ensures that the transitions begin in the middle of the sensor interval when $\omega_{PLL}$ equals $\omega_2$. In combination, the transition mode operates without any delays between transitions when $\omega_{PLL}$ equals $\omega_2$, preparing the system for continuous mode. FIG. 7 illustrates the operation of transition mode. In this illustration, the transitions at 60 and 120° are shown as occurring early, the transition at 180'° is perfectly timed, and the transitions at 240 and 300° are late. FIG. 7 describes the transition-mode logic in flowchart form. FIG. 8 shows the effect of transition mode on a three-phase sinusoidal current inverter.

In an alternative embodiment of transition mode, when $\theta_{PLL}>(\theta_{max}-\Delta*F(\omega))$, $\theta_{ctrl}$ is raised at a fixed rate $\theta_{ctrl}$, much greater than $\omega_1$, to the midpoint of the next sensor interval. This eliminates the plateaus at $\theta_{max}$, and produces symmetrical current waveforms.

Figure 10:
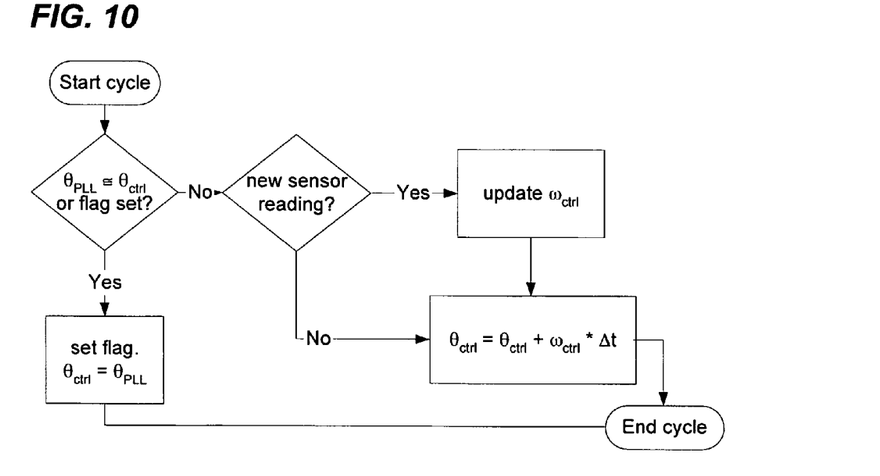
FIG. 10 illustrates the logic flow for control based on the $\theta_{ctrl}$ output when in a second, high speed mode of operation in accordance with the first embodiment of the invention.

When a sensor transition occurs in continuous mode, $\omega_{ctrl}$ is set to $(\omega_{PLL}+\epsilon)$, $\epsilon$ is a small positive value when $\theta_{PLL}<\theta_{sensor}$, or a small negative value when $\theta_{PLL}>\theta_{sensor}$, where $\theta_{sensor}$ is the angle of the sensor transition. $\omega_{ctrl}$ is then used to continuously update $\theta_{ctrl}$. When $\theta_{PLL}$ is approximately equal to $\theta_{ctrl}$, a flag is set to indicate that the continuous mode is synchronized and $\theta_{ctrl}$ is continuously set to $\theta_{PLL}$. This flag remains set until $\omega_{PLL}$ is less than $\omega_2$. In this fashion, the transition to controlling the polyphase inverter directly from the position estimation means occurs without an abrupt shift in control angle. FIG. 10 describes this logic in flowchart form. In a preferred embodiment of this invention, the logic for the three control modes is implemented in the software of the polyphase inverter control means.

Figure 11:
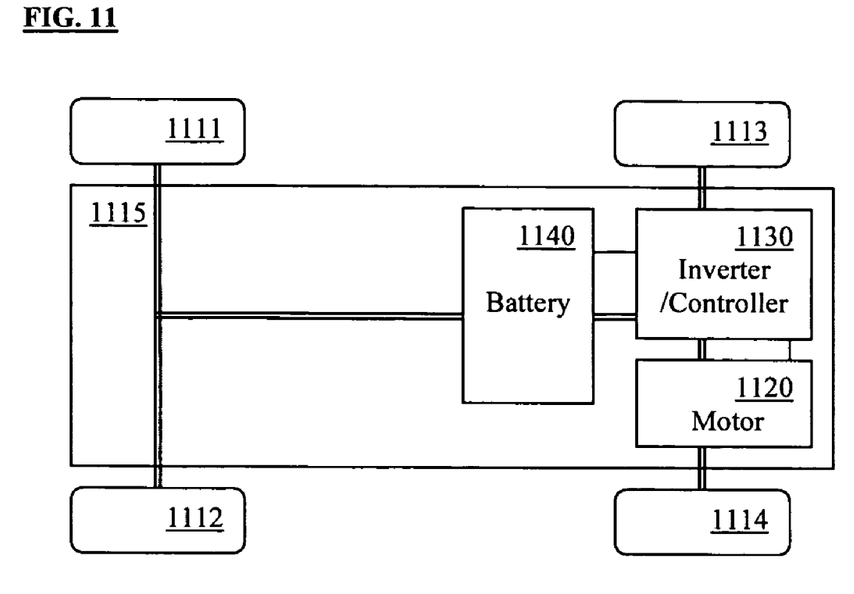
FIG. 11 is a block diagram illustrating a vehicle in accordance with a further embodiment of the invention.

Referring to FIG. 11, an exemplary embodiment of an electric vehicle 1110 according to the invention includes a plurality of wheels 1111, 1112, 1113, and 1114 and a vehicle chassis 1115. The wheels 1113 and 1114 are coupled to electric motors 1120 through gear boxes (not shown). The wheels 1113 and 1114 may be mounted by any appropriate suspension means for the vehicle being designed, including independent suspensions or by axle, and may be front, rear, or all wheel drive systems. In one exemplary embodiment the vehicle is a taxi, but it may include recreational vehicles or larger ones like buses, and may also apply to hybrid vehicles (which include alternate forms of propulsion). The electric motor 1120 is powered by a battery 1140 and controlled by motor controllers 1130. According to this exemplary embodiment, the electric motor 1120 is an AC synchronous motor, including permanent magnets such as rare earth magnets for creating or inducing a magnetic field on the rotating portion (rotor, not shown) of the motor. Sensors are also located on the rotor, Thus, the present invention provides an improved variable speed drive for an AC synchronous motor, such as that of an electric vehicles. The plural modes of operation allows for the reduction in required rotor position sensor resolution as compared to conventional synchronous variable speed drives, resulting in cost savings in the sensor device and associated wiring. It is also quieter and more efficient operation at high speed as compared to conventional trapezoidal-current/DC-brushless motor drives.

Of course, those skilled in the art will appreciate how a variety of alternatives are possible for the individual elements, and their arrangement, described above, while still falling within the scope of the invention. Thus, while it is important to note that the present invention has been described in the context of a particular three phase electric motor and inverter, those of ordinary skill in the art will appreciate that the components and processes of the present invention are capable of being implemented with different inverters, sensors, plural motors (e.g., for each wheel), etc., including replacement with equivalently functioning hardware chips and/or software for key components.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

We claim:

1. A variable speed drive system, comprising: a synchronous electric motor, operably coupled to an output shaft, and operable for applying a varying force to the output shaft in response to a varying input AC electric signal; a control unit, operably coupled to a battery, plural rotor sensors, and a drive unit, and operable, in response to signaling indicative of the position of one or more sensors, to generate the input signal according to a first mode for low speed operation, a second mode for high speed operation, and a transitional mode between first and second thresholds, wherein the control unit comprises a polyphase inverter coupled to the drive unit, a controller coupled to the inverter, and a position estimator coupled to the controller and operably coupled to the sensors, wherein the position estimator comprises a phase locked loop operable to control the drive unit in the second mode according to a continuous waveform function, and an angular position interpolator operable to control the drive unit in the first mode according to a step waveform function.

2. The drive of claim 1, wherein the position estimator is operable to initialize the first mode based on a midpoint of an angular range between detected immediately prior and next sensor positions, and after initialization the controller is operable to change settings of inverter switches based on an input control angle, the control angle derived from detected sensor position information; wherein the position estimator and controller together comprise a processor configured to execute a polyphase AC control program; and wherein the processor, when executing said program, is operably configured to perform an operation having plural instructions comprising first instructions for controlling the drive unit in the first mode according to a step waveform function, second instructions for controlling the drive unit in the second mode according to a continuous waveform function, and third instructions for controlling the drive unit in the transition mode according to a transition waveform function.

3. The drive of claim 2, wherein the processor, when executing said program, is operable to execute mode change instructions to apply the first instructions when operating at less than a first angular speed, the second instructions when operating at a second angular speed greater than the first angular speed, and the third instructions when operating at an angular speed between the first and second angular speeds.

4. The drive of claim 1, wherein the control unit is configured for changing the input control angle based on the position output of the phase locked loop, $\theta_{PLL}$, such that a control angle $\theta_{ctrl}$ is held constant until $\theta_{PLL}>(\theta_{max}-\Delta*F(\omega))$, where $\theta_{max}$ is the angular position of a next sensor transition and F is a non-decreasing function equal to zero below the first threshold $\omega_1$ and 0.5 above the second threshold $\omega_2$, and $\Delta$ is the width of a current interval between the detected immediately prior and next sensor positions.

5. The drive of claim 4, wherein the control unit is configured such that, when $\theta_{PLL}>(\theta_{max}-\Delta*F(\omega))$, $\theta_{ctrl}$ is raised at a fixed rate $\omega_{ctrl}$, which is greater than $\omega_{PLL}$, to $\theta_{max}$.

6. The drive of claim 5, wherein the control unit is configured such that, when $\theta_{ctrl}$ is equal to $\theta_{max}$, $\theta_{ctrl}$ is held constant until a next sensor transition is detected.

7. The drive of claim 3, wherein the position estimator is operable to initialize the first mode based on a midpoint of an angular range between detected immediately prior and next sensor positions, and after initialization the controller is operable to change settings of inverter switches based on an input control angle, the control angle derived from detected sensor position information; wherein the position estimator and controller together comprise a processor configured to execute a polyphase AC control program; and wherein the processor, when executing said program, is operably configured to perform an operation having plural instructions comprising first instructions for controlling the drive unit in the first mode according to a continuous waveform function, second instructions for controlling the drive unit in the second mode according to the step waveform function, and third instructions for controlling the drive unit in the transition mode according to a transition waveform function.

8. The drive of claim 7, wherein the processor, when executing said program, is operable to execute mode change instructions to apply the first instructions when operating at less than a first angular speed, the second instructions when operating at a second angular speed greater than the first angular speed, and the third instructions when operating at an angular speed between the first and second angular speeds.

9. An electric vehicle, comprising:
a multi-wheel drive system coupled to a drive shaft;
a battery; and
a variable speed drive system, comprising: a synchronous electric motor, operably coupled to the drive shaft, and operable for applying a varying force to the drive shaft in response to a varying input AC electric signal; a control unit, operably coupled to a battery, plural rotor sensors, and the motor, and operable, in response to signaling indicative of the position of one or more sensors, to generate the input signal according to a first mode for low speed operation, a second mode for high speed operation, and a transitional mode between first and second thresholds, wherein the control unit comprises a polyphase inverter coupled to the motor, a controller coupled to the inverter, and a position estimator coupled to the controller and operably coupled to the sensors, and wherein the position estimator is operable to control the motor in the second mode according to a continuous waveform function, and an angular position interpolator operable to control the motor in the first mode according to a step waveform function.

10. The vehicle of claim 9, wherein the position estimator is operable to initialize the first mode based on a midpoint of an angular range between detected immediately prior and next sensor positions, and after initialization the controller is operable to change settings of inverter switches based on an input control angle, the control angle derived from detected sensor position information.

11. The vehicle of claim 10: wherein the position estimator and controller together comprise a processor configured to execute a polyphase AC control program; wherein the processor, when executing said program, is operably configured to perform an operation having plural instructions comprising first instructions for controlling the motor in the first mode according to a continuous waveform function, second instructions for controlling the motor in the second mode according to the step waveform function, and third instructions for controlling the motor in the transition mode according to a transition waveform function; wherein the processor, when executing said program, is operable to execute mode change instructions to apply the first instructions when operating at less than the first threshold, the second instructions when operating at a second angular speed greater than the second threshold, and the third instructions when operating at an angular speed between the first and second thresholds.

12. The vehicle of claim 10, wherein the control unit is configured so the input control angle is changed based on the position output, $\theta_{PLL}$, of the position estimator, which position estimator comprises a phase locked loop, such that a control angle $\theta_{ctrl}$ is held constant until $\theta_{PLL} > (\theta_{max} - \Delta^* F(\omega))$, where $\theta_{max}$ is the angular position of a next sensor transition and F is a non-decreasing function equal to zero below the first threshold $\omega_1$ and 0.5 above the second threshold $\omega_2$, and $\Delta$ is the width of a current interval between the detected immediately prior and next sensor positions.

13. The vehicle of claim 12, wherein the control unit is configured such that:

wherein when $\theta_{PLL} > (\theta_{max} - \Delta^* F(\omega)), \theta_{ctrl}$ is raised at a fixed rate $\omega_{ctrl}$, which is greater than $\omega_{PLL}$, to $\theta_{max}$; and wherein when $\theta_{ctrl}$ is equal to $\theta_{max}$, $\theta_{ctrl}$ is held constant until a next sensor transition is detected.

14. The vehicle of claim 10, wherein the sensors comprise one of the group consisting of Hall effect sensors and optical encoders.

15. A method of operating an electric vehicle, comprising: providing a varying force to a drive shaft of a multi-wheel drive system by a synchronous electric motor, operably coupled to the drive shaft, the varying force being applied in response to a varying input AC electric signal generating the input signal by a control unit, operably coupled plural rotor sensors and the motor, in response to signaling indicative of the position of one or more sensors, the input signal being generated according to a first mode for low speed operation, a second mode for high speed operation, and a transitional mode between first and second thresholds, wherein the control unit comprises a polyphase inverter coupled to the motor, a controller coupled to the inverter, and a position estimator coupled to the controller and operably coupled to the sensors, further comprising controlling the motor in the second mode according to a continuous waveform function, and controlling the motor in the first mode according to a step waveform function.

16. The method of claim 15, further comprising initializing the first mode based on a midpoint of an angular range between detected immediately prior and next sensor positions, and after initialization changing settings of inverter switches based on an input control angle, the control angle derived from detected sensor position information.

17. The method of claim 16, wherein the position estimator and controller together comprise a processor configured to execute a polyphase AC control program operably configured to perform an operation having plural instructions, further comprising:

controlling the motor in the first mode according to a continuous waveform function when operating at less than the first threshold; controlling the motor in the second mode according to the step waveform function when operating at a second angular speed greater than the second threshold; and controlling the motor in the transition mode according to a transition waveform function when operating at an angular speed between the first and second thresholds.

18. The method of claim 16, wherein the input control angle is changed based on the position output, $\theta_{PLL}$, of the position estimator, the position estimator comprising a phase locked loop, such that a control angle $\theta_{ctrl}$ is held constant until $\theta_{PLL} > (\theta_{max} - \Delta^* F(\omega))$, where $\theta_{max}$ is the angular position of a next sensor transition and F is a non-decreasing function equal to zero below the first threshold $\omega_1$ and 0.5 above the second threshold $\omega_2$, and $\Delta$ is the width of a current interval between the detected immediately prior and next sensor positions.

19. The method of claim 18:

wherein when $\theta_{PLL} > (\theta_{max} - \Delta^* F(\omega)), \theta_{ctrl}$ is raised at a fixed rate $\omega_{ctrl}$, which is greater than $\omega_{PLL}$, to $\theta_{max}$; and wherein when $\theta_{ctrl}$ is equal to $\theta_{max}$, $\theta_{ctrl}$ is held constant until a next sensor transition is detected.

20. A method of operating a variable speed drive unit, comprising: providing a varying force to a drive shaft by a synchronous electric motor of the drive unit, operably coupled to the drive shaft, the varying force being applied in response to a varying input AC electric signal; generating the input signal by a control unit, operably coupled plural rotor sensors and the motor, in response to signaling indicative of the position of one or more sensors, the input signal being generated according to a first mode for low speed operation, a second mode for high speed operation, and a transitional mode between first and second thresholds wherein the control unit comprises a polyphase inverter coupled to the motor, a controller coupled to the inverter, and a position estimator coupled to the controller and operably coupled to the sensors, further comprising controlling the motor in the second mode according to a continuous waveform function, and controlling the motor in the first mode according to a step waveform function, further comprising initializing the first mode based on a midpoint of an angular range between detected immediately prior and next sensor positions, and after initialization changing settings of inverter switches based on an input control angle, the control angle derived from detected sensor position information.

21. The method of claim 20, wherein the position estimator and controller together comprise a processor configured to execute a polyphase AC control program operably configured to perform an operation having plural instructions, further comprising: controlling the motor in the first mode according to a continuous waveform function when operating at less than the first threshold; controlling the motor in the second mode according to the step waveform function when operating at a second angular speed greater than the second threshold; and controlling the motor in the transition mode according to a transition waveform function when operating at an angular speed between the first and second thresholds.

22. The method of claim 21, wherein the input control angle is changed based on the position output of the position estimator, $\theta_{PLL}$, the position estimator comprising a phase locked loop, such that a control angle $\theta_{ctrl}$ is held constant until $\theta_{PLL} > (\theta_{max} - \Delta * F(\omega))$, where $\theta_{max}$ is the angular position of a next sensor transition and F is a non-decreasing function equal to zero below the first threshold $\omega_1$ and 0.5 above the second threshold $\omega_2$, and $\Delta$ is the width of a current interval between the detected immediately prior and next sensor positions;

wherein when $\theta_{PLL} > (\theta_{max} - \Delta * F(\omega))$, $\theta_{ctrl}$ is raised at a fixed rate $\omega_{ctrl}$, which is greater than $\theta_{PLL}$, to $\theta_{max}$; and wherein when $\theta_{ctrl}$ is equal to $\theta_{max}$, $\theta_{ctrl}$ is held constant until a next sensor transition is detected.

* * * * *